(12) United States Patent
Lan et al.

(10) Patent No.: US 11,821,176 B2
(45) Date of Patent: Nov. 21, 2023

(54) SUPERVISORY AND IMPROVEMENT SYSTEM FOR MACHINE CONTROL

(71) Applicant: Deere & Company, Moline, IL (US)

(72) Inventors: Bradley Lan, Cambridge, MA (US); Wentao Yu, Bettendorf, IA (US); Bhanu Kiran Reddy Palla, Bettendorf, IA (US); Volker Fuchs, Saarburg (DE)

(73) Assignee: Deere & Company, Moline, IL (US)

(*) Notice: Subject to any disclaimer, the term of this patent is extended or adjusted under 35 U.S.C. 154(b) by 1052 days.

(21) Appl. No.: 16/556,931

(22) Filed: Aug. 30, 2019

(65) Prior Publication Data

US 2021/0062474 A1 Mar. 4, 2021

(51) Int. Cl.
| | | |
|---|---|---|
| *E02F 9/26* | (2006.01) | |
| *G05B 13/02* | (2006.01) | |
| *H04L 67/12* | (2022.01) | |
| *G06F 3/01* | (2006.01) | |
| *G06N 3/08* | (2023.01) | |
| *G06V 40/16* | (2022.01) | |
| *G07C 5/08* | (2006.01) | |

(52) U.S. Cl.
CPC ............ *E02F 9/265* (2013.01); *G05B 13/021* (2013.01); *G06F 3/013* (2013.01); *G06N 3/08* (2013.01); *G06V 40/161* (2022.01); *G07C 5/0808* (2013.01); *G07C 5/0841* (2013.01); *H04L 67/12* (2013.01)

(58) Field of Classification Search
CPC ... E02F 9/265; G05B 13/021; G05B 13/0265; G05B 13/042; G06F 3/013; G06F 2203/011; G06F 3/011; G06N 3/08; G06N 20/00; G06V 40/161; G07C 5/0808; G07C 5/0841; H04L 67/12
See application file for complete search history.

(56) References Cited

U.S. PATENT DOCUMENTS

| | | | | |
|---|---|---|---|---|
| 5,659,467 A | * | 8/1997 | Vickers ................. | G05B 17/02 700/9 |
| 6,070,538 A | * | 6/2000 | Flamme ................. | A01C 7/102 340/684 |
| 6,553,300 B2 | * | 4/2003 | Ma ....................... | A01D 41/127 700/47 |

(Continued)

*Primary Examiner* — Sizo B Vilakazi
(74) *Attorney, Agent, or Firm* — Joseph R. Kelly; Kelly, Holt & Christenson PLLC

(57) ABSTRACT

A mobile machine includes a propulsion subsystem that propels the mobile machine across an operational environment. The mobile machine also includes machine monitoring logic that receives a sensor signal indicative of a value of a sensed machine variable and operator monitoring logic that receives an operator sensor signal indicative of a value of a sensed operator variable. The mobile machine also includes performance index generator logic that receives the sensed machine variable and the sensed operator value and generates a performance index based on the sensed machine variable and the sensed operator value. The mobile machine also includes optimization system that accesses historic circumstantial data and receives the performance index and generates an optimization signal based on the performance index, and the historic circumstantial data and control signal generator logic that generates a control signal based on the optimization signal to perform a machine operation.

20 Claims, 10 Drawing Sheets

(56) References Cited

U.S. PATENT DOCUMENTS

| | | | | |
|---|---|---|---|---|
| 8,935,060 | B2* | 1/2015 | Baumgarten | A01D 41/127 701/1 |
| 2008/0034720 | A1* | 2/2008 | Helfrich | A01D 41/127 56/10.2 R |
| 2009/0099737 | A1* | 4/2009 | Wendte | A01D 41/1243 701/50 |
| 2010/0311017 | A1* | 12/2010 | Coil | G09B 9/052 701/31.4 |
| 2014/0019018 | A1* | 1/2014 | Baumgarten | A01D 41/127 701/50 |
| 2016/0000008 | A1* | 1/2016 | Schøler | A01D 41/1272 56/10.2 R |
| 2017/0235471 | A1* | 8/2017 | Schøler | G01F 1/666 715/772 |
| 2018/0229674 | A1* | 8/2018 | Heinrich | B60K 28/063 |
| 2019/0152492 | A1* | 5/2019 | el Kaliouby | G06V 40/172 |
| 2021/0062474 | A1* | 3/2021 | Lan | G05B 13/021 |

* cited by examiner

SUPERVISORY AND IMPROVEMENT SYSTEM FOR MACHINE CONTROL

FIELD OF THE DESCRIPTION

The present description relates to controlling machines. More specifically, the present description relates to improving overall machine control, using machine learning and non-traditional data sources.

BACKGROUND

There are a wide variety of different types of mobile machines. Such machines can include agricultural machines, forestry machines, construction machines, turf management machines, among others. Such machines can sometimes be difficult to control, as desired.

However, even when they are not, it can be difficult to determine how best to operate the machine, under different circumstances, in order to obtain desired performance in terms of efficiency or across other dimensions. This problem is exacerbated when the operation of a fleet of highly configurable machines, such as combines, (the operation of more than one machine) is considered. It can be difficult to know how to control each of those machines in order to improve the overall performance of each machine, and thus the fleet.

The discussion above is merely provided for general background information and is not intended to be used as an aid in determining the scope of the claimed subject matter.

SUMMARY

A mobile machine includes a propulsion subsystem that propels the mobile machine across an operational environment. The mobile machine also includes machine monitoring logic that receives a sensor signal indicative of a value of a sensed machine variable and operator monitoring logic that receives an operator sensor signal indicative of a value of a sensed operator variable. The mobile machine also includes performance index generator logic that receives the sensed machine variable and the sensed operator value and generates a performance index based on the sensed machine variable and the sensed operator value. The mobile machine also includes optimization system that accesses historic circumstantial data and receives the performance index and generates an optimization signal based on the performance index, and the historic circumstantial data and control signal generator logic that generates a control signal based on the optimization signal to perform a machine operation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
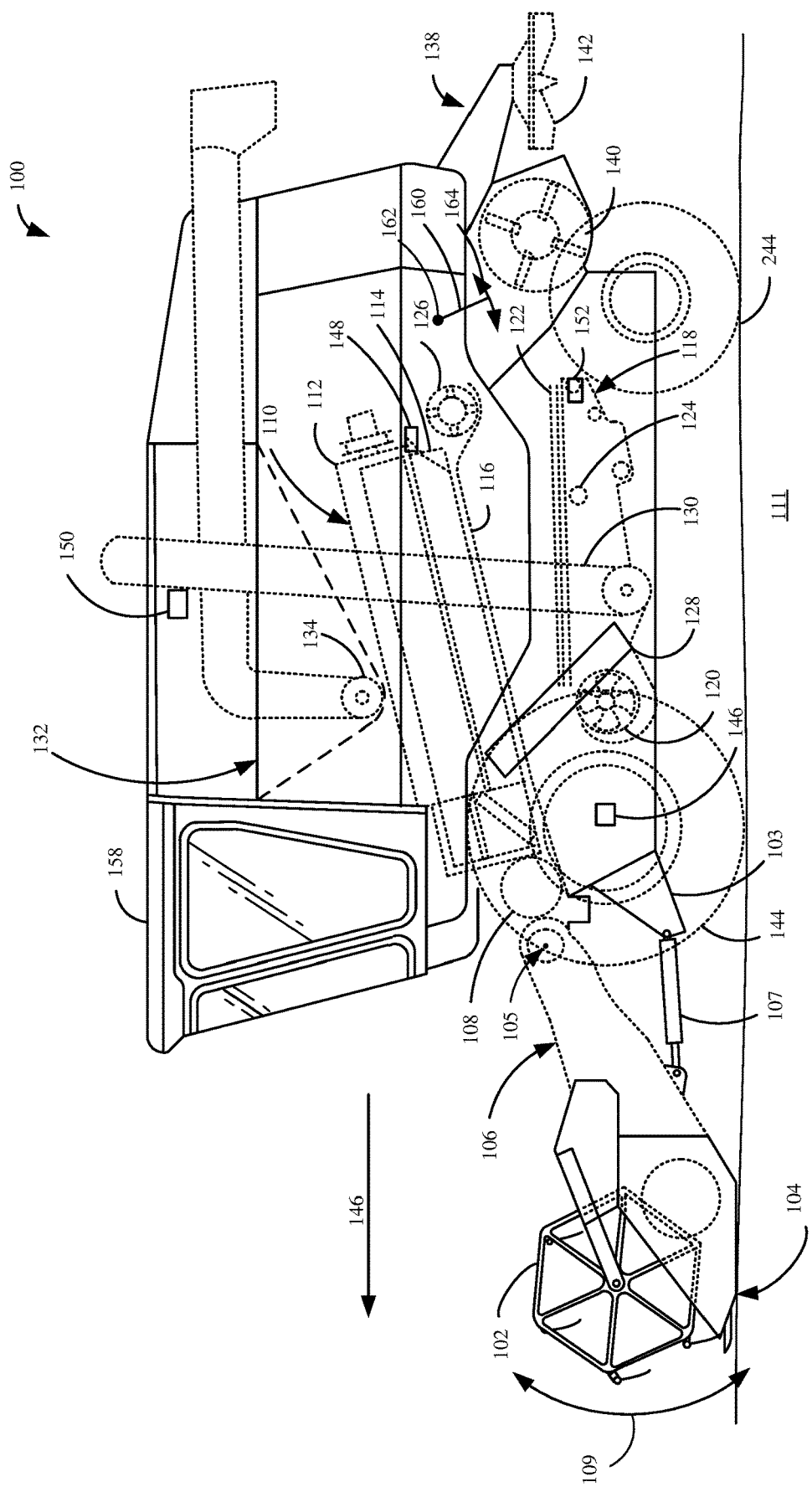
FIG. 1 is a partial pictorial, partial schematic diagram of a combine harvester.

As just one example, mobile machines can include combine harvesters. Such machines can be relatively complicated to operate, and they can be operated in an attempt to enhance performance values or indexes according to one of many different dimensions calculated based on machine sensor feedback. As an example, the combine harvester may be controlled in one way in order to improve its performance in terms of productivity (e.g., tons of grain harvested per hour). However, as resources are allocated to a subsystem to increase productivity, this may allocate resources away from another subsystem which comes at the expense of another performance category, such as threshing quality, or grain loss. Similarly, by increasing the rate at which grain is harvested (productivity), performance may also suffer in terms of other performance categories, such as grain loss and perhaps even grain quality.

In some current systems, operators and even control systems, attempt to control allocate resources amongst the different individual subsystems in order to improve one performance category. However, this can reduce the overall efficiency of the machine (and of an entire fleet where multiple machines are controlled in this way) in performing the operation, as the system is very complex and one minor adjustment in one subsystem can affect the machine operation in unintended ways. It may be that instead of focusing on one category, productivity, for instance, by modifying the operation of one subsystem, vehicle speed, for instance, a supervisory system is provided and both productivity and fuel economy should be considered together, in controlling the machine. This may improve the overall efficiency of the machine and/or fleet when implemented in a wider scale.

This has been difficult, in current systems, because the performance category tradeoffs and subsystem performance tradeoffs are hard for an operator or a simple control system to predict in ever changing environments across many machines.

Thus, the present description proceeds with respect to a supervisory and optimization (or improvement) system that analyzes, using a neural network or deep machine learning system, situational data (e.g., machine settings, environmental factors, operator sensor feedback, field characteristics, etc.) and the performance/consumption indexes that the situational data resulted in. This way the system can "learn" from an immense amount of historical and/or runtime situational data and the indexes they resulted in, when controlling the mobile machine to an optimal performance level. Additionally, the supervisory and optimization (or improvement) system can receive inputs from non-traditional sources, such as weather sources, yield maps, terrain maps, and human observations/interactions. The control can be performed in an automated, closed loop fashion, or different control operations can be surfaced for an operator and performed manually, or the control can be performed as a combination of both automated and manual control operations.

FIG. 1 is a partial pictorial, partial schematic, illustration of a self-propelled agricultural harvesting machine 100, in an example where machine 100 is a combine harvester (or combine). It can be seen in FIG. 1 that combine 100 illustratively includes an operator compartment 101, which can have a variety of different operator interface mechanisms, for controlling combine 100. Combine 100 can include a set of front end equipment that can include header 102, and a cutter generally indicated at 104. It can also include a feeder house 106, a feed accelerator 108, and a thresher generally indicated at 110. Header 102 is pivotally coupled to a frame 103 of combine 100 along pivot axis 105. One or more actuators 107 drive movement of header 102 about axis 105 in the direction generally indicated by arrow 109. Thus, the vertical position of header 102 above ground 111 over which it is traveling can be controlled by actuating actuator 107. While not shown in FIG. 1, it may be that the tilt (or roll) angle of header 102 or portions of header 102 can be controlled by a separate actuator. Tilt, or roll, refers to the orientation of header 102 about the front-to-back longitudinal axis of combine 100.

Thresher 110 illustratively includes a threshing rotor 112 and a set of concaves 114. Further, combine 100 can include a separator 116 that includes a separator rotor. Combine 100 can include a cleaning subsystem (or cleaning shoe) 118 that, itself, can include a cleaning fan 120, chaffer 122 and sieve 124. The material handling subsystem in combine 100 can include (in addition to a feeder house 106 and feed accelerator 108) discharge beater 126, tailings elevator 128, clean grain elevator 130 (that moves clean grain into clean grain tank 132) as well as unloading auger 134 and spout 136. Combine 100 can further include a residue subsystem 138 that can include chopper 140 and spreader 142. Combine 100 can also have a propulsion subsystem that includes an engine that drives ground engaging wheels 144 or tracks, etc. It will be noted that combine 100 may also have more than one of any of the subsystems mentioned above (such as left and right cleaning shoes, separators, etc.).

In operation, and by way of overview, combine 100 illustratively moves through a field in the direction indicated by arrow 146. As it moves, header 102 engages the crop to be harvested and gathers it toward cutter 104. The operator illustratively sets a height setting for header 102 (and possibly a tilt or roll angle setting) and a control system (described below) controls actuator 107 (and possibly a tilt or roll actuator—not shown) to maintain header 102 at the set height above ground 111 (and at the desired roll angle). The control system responds to header error (e.g., the difference between the set height and measured height of header 104 above ground 111 and possibly roll angle error) with a responsiveness that is determined based on a set sensitivity level. If the sensitivity level is set high, the control system responds to, smaller header position errors, and attempts to reduce them more quickly than if the sensitivity is set lower.

After the crop is cut by cutter 104, it is moved through a conveyor in feeder house 106 toward feed accelerator 108, which accelerates the crop into thresher 110. The crop is threshed by rotor 112 rotating the crop against concaves 114. The threshed crop is moved by a separator rotor in separator 116 where some of the residue is moved by discharge beater 126 toward the residue subsystem 138. It can be chopped by residue chopper 140 and spread on the field by spreader 142. In other configurations, the residue is simply chopped and dropped in a windrow, instead of being chopped and spread.

Grain falls to cleaning shoe (or cleaning subsystem) 118. Chaffer 122 separates some of the larger material from the grain, and sieve 124 separates some of the finer material from the clean grain. Clean grain falls to an auger in clean grain elevator 130, which moves the clean grain upward and deposits it in clean grain tank 132. Residue can be removed from the cleaning shoe 118 by airflow generated by cleaning fan 120. Cleaning fan 120 directs air along an airflow path upwardly through the sieves and chaffers and the airflow carries residue can also be rearwardly in combine 100 toward the residue handling subsystem 138.

Tailings can be moved by tailings elevator 128 back to thresher 110 where they can be re-threshed. Alternatively, the tailings can also be passed to a separate re-threshing mechanism (also using a tailings elevator or another transport mechanism) where they can be re-threshed as well.

FIG. 1 also shows that, in one example, combine 100 can include ground speed sensor 147, one or more separator loss sensors 148, a clean grain camera 150, and one or more cleaning shoe loss sensors 152. Ground speed sensor 146 illustratively senses the travel speed of combine 100 over the ground. This can be done by sensing the speed of rotation of the wheels, the drive shaft, the axel, or other components. The travel speed can also be sensed by a positioning system, such as a global positioning system (GPS), a dead reckoning system, a LORAN system, or a wide variety of other systems or sensors that provide an indication of travel speed.

Cleaning shoe loss sensors 152 illustratively provide an output signal indicative of the quantity of grain loss by both the right and left sides of the cleaning shoe 118. In one example, sensors 152 are impact sensors which count grain strikes per unit of time (or per unit of distance traveled) to provide an indication of the cleaning shoe grain loss. The impact sensors for the right and left sides of the cleaning shoe can provide individual signals, or a combined or aggregated signal. It will be noted that sensors 152 can comprise only a single sensor as well, instead of separate sensors for each shoe.

Separator loss sensor 148 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 148 may also comprise only a single sensor, instead of separate left and right sensors.

It will also be appreciated that sensor and measurement mechanisms (in addition to the sensors already described) can include other sensors on combine 100 as well. For instance, they can include a header height sensor that senses a height of header 102 above ground 111. They can include stability sensors that sense oscillation or bouncing motion (and amplitude) of combine 100. They can include a residue setting sensor that is configured to sense whether machine 100 is configured to chop the residue, drop a windrow, etc. They can include cleaning shoe fan speed sensors that can be configured proximate fan 120 to sense the speed of the fan. They can include a threshing clearance sensor that senses clearance between the rotor 112 and concaves 114. They include a threshing rotor speed sensor that senses a rotor speed of rotor 112. They can include a chaffer clearance sensor that senses the size of openings in chaffer 122. They can include a sieve clearance sensor that senses the size of openings in sieve 124. They can include a material other than grain (MOG) moisture sensor that can be configured to sense the moisture level of the material other than grain that is passing through combine 100. They can include machine setting sensors that are configured to sense the various configurable settings on combine 100. They can also include a machine orientation sensor that can be any of a wide variety of different types of sensors that sense the orientation of combine 100. Crop property sensors can sense a variety of different types of crop properties, such as crop type, crop size (e.g., stalk width), crop moisture, and other crop properties. They can also be configured to sense characteristics of the crop as they are being processed by combine 100. For instance, they can sense grain feed rate (e.g., mass flow rate), as it travels through clean grain elevator 130, or provide other output signals indicative of other sensed variables. Environment sensors can sense soil moisture, soil compaction, weather (which may be sensed or downloaded), temperature, standing water, and other properties of the soil, crop, machine or environment. Some additional examples of the types of sensors that can be used are described below.

Figure 2:
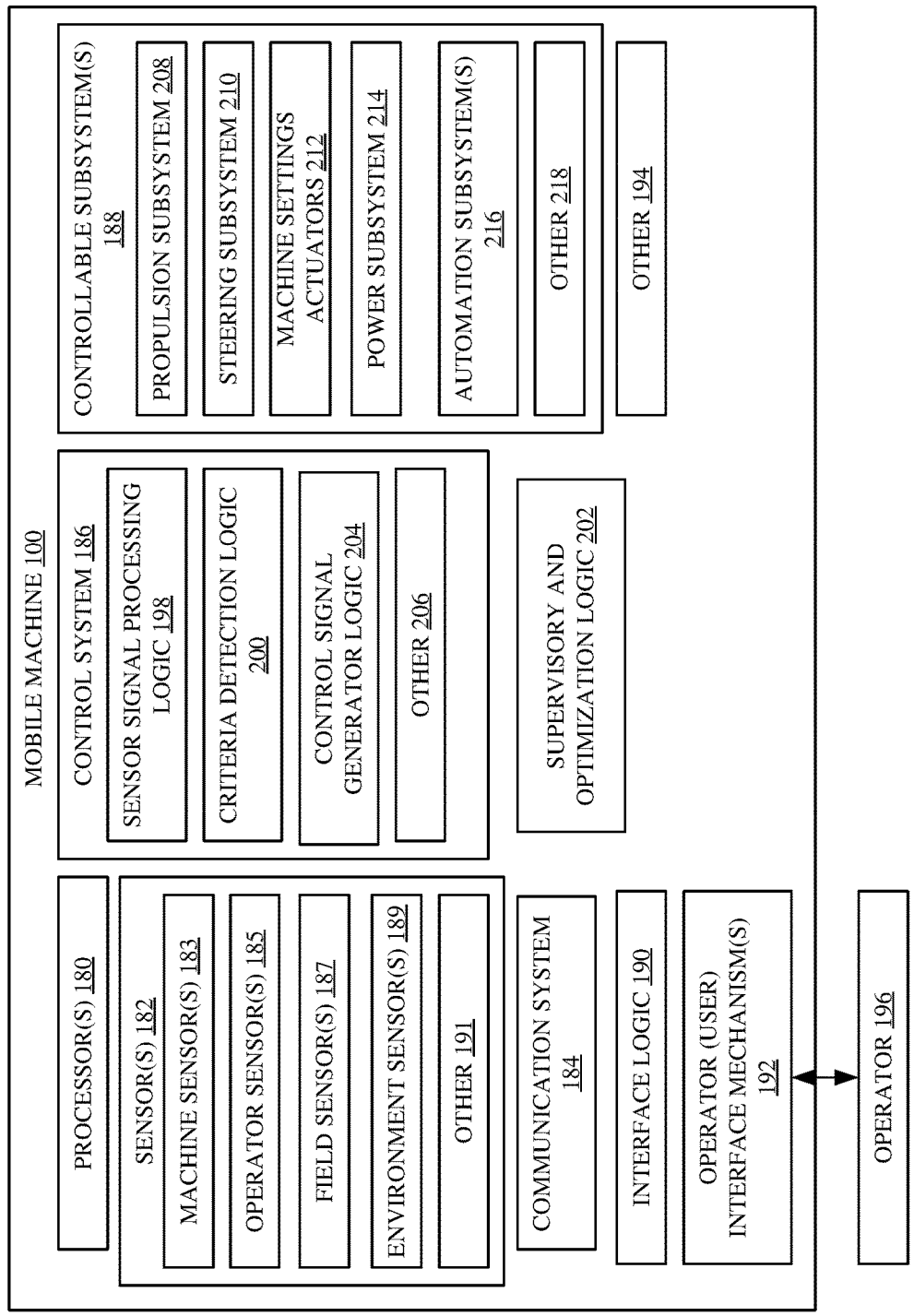
FIG. 2 is a block diagram showing one example of the combine harvester, in more detail.

FIG. 2 is a block diagram showing portions of mobile machine 100, in more detail. FIG. 2 shows that machine 100 includes one or more processors 180, sensors 182 (which may be the sensors discussed above or different or additional sensors), communication system 184, control system 186, controllable subsystems 188, interface logic 190, operator (user) interface mechanisms 192, and it can include a wide variety of other items 194. FIG. 2 also shows that, in one example, operator 196 interacts with operator interface mechanisms 192 in order to control and manipulate mobile machine 100. Thus, operator interface mechanisms 192 can include such things as levers, pedals, a steering wheel, joysticks, mechanical or other linkages, user interface displays, displays that include user actuatable elements (such as links, icons, buttons, etc.), among other things. When the user interface mechanisms 192 include speech recognition functionality, then the user interface mechanisms 192 can include a microphone and speaker for receiving user inputs by voice, and providing audible outputs. They can include speech synthesis functionality as well. Further, the user interface mechanisms 192 can include other audio, visual, haptic or other mechanisms.

Interface logic 190 can illustratively generate outputs on mechanisms 192 and detect user interactions with mechanisms 192. It can provide an indication of those interactions to other items in mobile machine 100, or it can use communication system 184 to communicate those actions to one or more remote systems. Thus, communication system 184 can include a controller area network (CAN) communication system, a near field communication system, a wide area network, a local area network, a cellular communication system, or other communication systems or combinations of systems.

Control system 186 illustratively includes sensor signal processing logic 198, criteria detection logic 200, supervisory and optimization system 202, control signal generator 204, and it can include a wide variety of other items 206. Sensor signal processing logic 198 illustratively receives signals from sensors 182 and/or other sensors, and processes those sensor signals to identify sensed variables. Logic 198 can include conditioning logic which performs such things as filtering, normalization, amplification, linearization, and/or other conditioning operations. It can perform other signal processing logic as well, such as aggregation, signal combination, or other processing functions.

Supervisory or optimization (or improvement) system 202 performs processing on the sensor signals, given the circumstances that have been detected (or in some cases manually input by an operator), to identify different control operations and to understand resource allocation that are to be performed in order to improve the performance of mobile machine 100, across multiple different dimensions, given the current circumstances. System 202 is described in greater detail below with respect to FIGS. 4-5.

Once control operations have been identified by system 202, a signal indicating those operations is provided to control signal generator logic 204. Logic 204 generates control signals to control one or more of the controllable subsystems 188 in order to execute the control operation that has been identified by system 202 which will, in turn, improve or optimize machine performance of machine 100.

The controllable subsystems 188 can include any or all of the subsystems discussed above with respect to FIG. 1 (where mobile machine 100 is a combine harvester), or they can include other controllable subsystems (on a combine harvester or on other machines). Some examples of controllable subsystems include a propulsion subsystem 208 that drives movement of machine 100, steering subsystem 210 that steers machine 100, machine settings actuators 212 that are actuated to change machine settings, power subsystem 214 that may change the power usage of machine 100, and automation subsystems 216 that may change the amount of the control of machine 100 that is performed using an automated control component. For instance, it may be that steering can be automatically controlled, or manually controlled. Similarly, it may be that the speed of the machine can be automatically or manually controlled. Further, it may be that the header height of the header on machine 100 can be controlled automatically. These and a wide variety of other automation systems can be engaged and operating, or they can be disengaged or turned off. Thus, these automation subsystems 216 can be controlled (turned on or off, or otherwise configured) by the control signals generated by control signal generator logic 204.

Controllable subsystems 188 can include a wide variety of other controllable subsystems as well. This is indicated by block 218.

Sensors 182 include machine sensors 183, operator sensors 185, field sensors 187, environment sensors 189 and can include other sensors as well, as indicated by block 191. Machine sensors 183 detect various components of mobile machine 100. For example, there may be a one or more machine sensors 183 for each controllable subsystem 188. For instance, there may be machine direction and machine speed sensors for steering subsystem 210/propulsion subsystem 208 and/or there may be pressure, temperature, voltage sensors detecting various components of power subsystem 214. Of course, these are only examples and there may be a wide variety of other machine sensors.

Operator sensors 185 can include sensors that detect a characteristic about operator 196. For example, operator sensor 185 can include an eye tracking sensor that tracks the eye position and eye movement of operator 196. This type of sensor can be used to detect where operator 196 is looking which can be indicative of what operator 196 feels is important. Operator sensor 185, in another example, includes a heart rate monitor that detects the heart rate of operator 196. Increased or decreased heart rate can be indicative of how operator 196 feels about the performance of mobile machine 100. Operator sensor 185, in another example, includes a body movement sensor. Body movement sensors can be body movements sensed by body movement sensors can be indicative of machine performance based on conscience conscious body movements (e.g., pointing to a component, gesturing, etc.) or sub conscience body movements (e.g., shaking, psychomotor agitation). In another example, operator sensors 185, can include a breathing sensor that takes the rate of breathing of operator 196. Labored or fast breathing cadence can be indicative of operator 196 stress due to machine performance. In another example, operator sensor 185 can include a facial expression sensor that detects a user's facial expression.

Field sensors 187 can include various sensors that detect characteristics of the field or operating environment. For example, field sensors 187 can include crop/vegetation sensors, moisture sensors, soil type sensors, etc.

Environment sensors 189 can include sensors that detect various characteristics of the operating environment. For example, environment sensors 189 can include weather radars, precipitation sensors, ambient temperature sensors, humidity sensors, geographic positioning sensors, etc. Sensors 182 can include other types sensors as well, as indicated by block 191.

Figure 3:
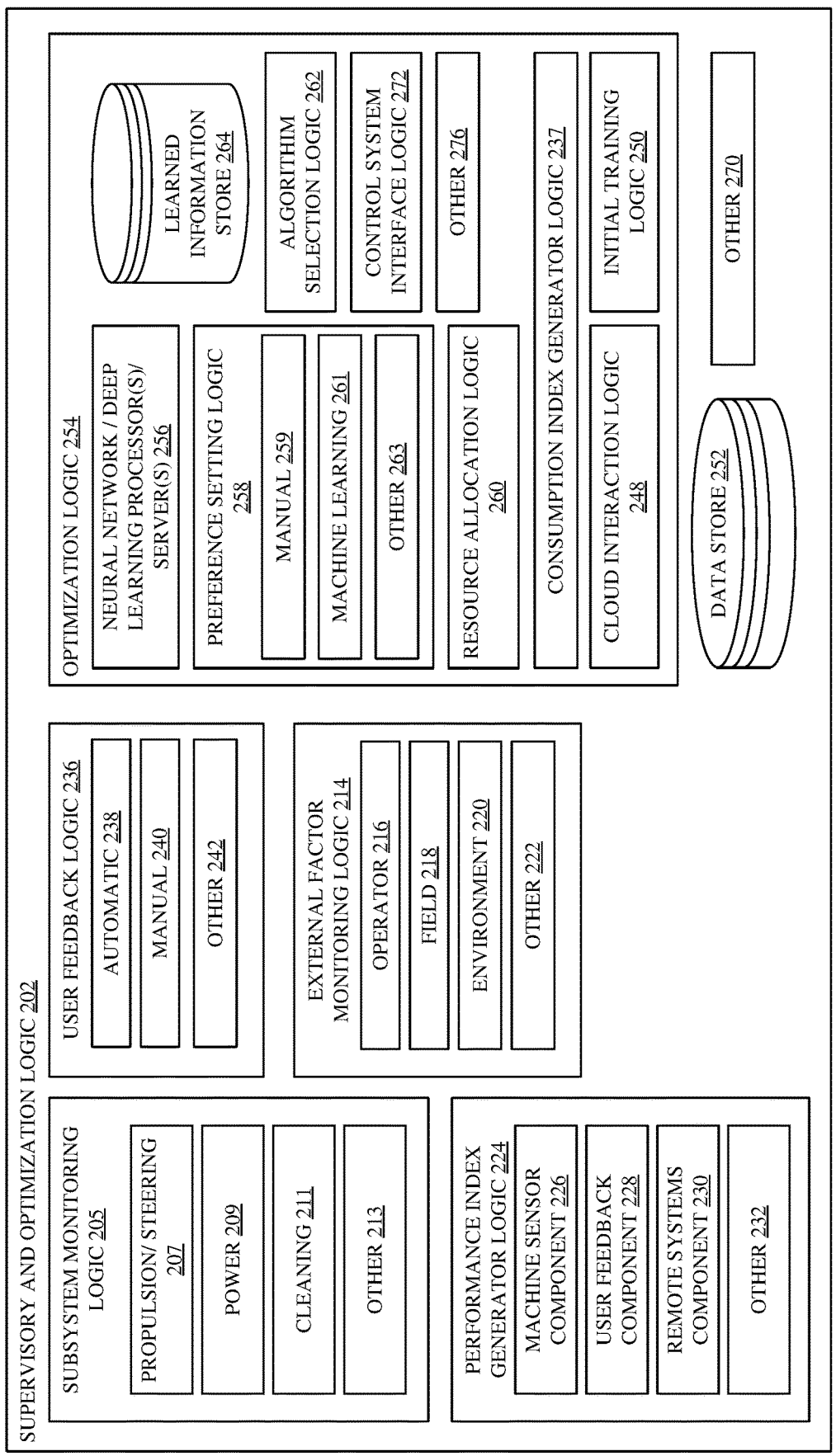
FIG. 3 is a block diagram showing one example of a supervisory or optimization (or improvement) system, in more detail.

FIG. 3 is a block diagram showing supervisory and optimization (or improvement) system 202 in greater detail. Supervisory and optimization (or improvement) system 202 includes subsystem monitoring logic 204, external factor monitoring logic 214, performance index generator logic 224, user feedback logic 236, user feedback logic 236, cloud interaction logic 248, datastore 252, optimization (or improvement) logic 254 and can include other items as well, as indicated by block 290.

Subsystem monitoring logic 204 includes propulsion/steering monitoring logic 207, power monitoring logic 209, cleaning monitoring 210 and can include other monitoring logic components as well, as indicated by block 213. Propulsion/steering monitoring logic 207 receives, processes and logs sensor signals (e.g., electrical impulses) from the sensors that monitor the propulsion and steering subsystems. Power monitoring logic 208 receives, processes and logs sensor signals from the sensors that senses characteristics of power subsystems 214. For instance, power monitoring logic 208 monitors available engine power and its allocation which is arguably the most critical resource on the machine which needs to be allocated properly. Cleaning monitoring logic 210 receives, processes and logs sensor signals from sensors that senses characteristics of a cleaning subsystem. Other monitoring logic 212 can include logic components that receive, process and log sensor signals corresponding to other subsystems, for example, separating, threshing, storage, spreading, cutting, transporting/feeder subsystems.

External factor monitoring logic 214 includes operator monitoring logic 216, field monitoring logic 218, environment monitoring logic 220 and can include other monitoring logic as well, as indicated by block 222. Operator monitoring logic 216 receives, processes and logs sensor signals from sensors that sense characteristics of operator 196. For instance, operator monitoring logic 216 receives sensor signals from a heart rate sensor and converts an analog signal into a digital heart rate value. Field monitoring logic 218 receives, processes and logs sensor signals from sensors that sense a characteristic of the field. For example, field monitoring logic 218 can receive sensor signals that are indicative of the soil moisture and convert these analog signals into digital moisture values (e.g., a percentage). Or for example, field monitoring logic 218 receives an image of the field from a sensor and determines the amount of standing vs down crop, stalk height, etc.

Environment monitoring logic 220 receives, processes and logs sensor signals from sensors that send characteristic of the operating environment. For example, environment monitoring logic 220 receives sensor signals and converts the sensor signals received from an analog ambient temperature sensor signal to a digital temperature value. Of course, environment monitoring logic 220 can receive other sensor signals as well and output other usable measures, such as, ambient temperature, sunshine, humidity, wind speed and direction, etc.

Performance index generator logic 224 generates a performance index, that is a value that quantifies how well the machine or a component of the machine is performing (e.g., compared to the operator's desired performance), for components of mobile machine 100. For example, performance index generator logic 224 generates a performance index for the cutting, transporting, threshing, separating, cleaning, spreading and propulsion/steering subsystems. To generate the performance indexes, performance index generator logic 224 aggregates contribution values from machine sensor component 226, user feedback component 228, remote systems component 230 and can use other components as well, as indicated by block 232. In some examples, performance index generator logic 224 aggregates only a subset of the contribution values from the above listed components.

Machine sensor component 226 receives information from machine sensors that sense characteristics of the machine subsystems or receives preprocessed data from of the sensor values from subsystem monitoring logic 204 and generates a machine contribution value for generating the performance index. For example, machine sensor component 226 receives data from a seed strike sensor indicative of grain count/savings in a cleaning system. As another example, machine sensor component 226 receives data from a hydraulic pressure sensor on a machine actuator indicating engine power consumption. In some current systems, performance indexes were generated based on only feedback from machine sensors and were not compared to an operator's desired performance.

User feedback component 228 receives data indicative of user feedback and generates a user contribution value for generating the performance index. For example, user feedback component 228 receives information indicative of user feedback from user feedback logic 236 and this data modifies the performance metric generated from other sources. For instance, if a machine appears to be operating well based on machine sensor feedback (e.g., from machine sensor component 226) but the operator is not satisfied with the performance, the overall performance index can be lowered. Also, if the machine appears to be operating poorly based on machine sensor feedback but the operator is satisfied with the performance, the overall performance index can be raised. Over time machine learning preference setting logic 259 can recognize what performance level is satisfying to what operators and will adjust the overall performance index accordingly.

Remote systems component 230 receives data from one or more remote systems and generates an additional contribution value to the performance index generated by performance index generator logic 224. For example, remote systems component 230 receives weather data from a remote weather source and modifies the performance index accordingly. For instance, a maximum performance in the rain (e.g., due to tires slipping in mud and wet crop being processed) is different than a maximum performance on dry soil, and therefore, the performance index should be adjusted accordingly to account for this. In another example, remote systems component 230 receives yield maps or previous yield data and generates a performance contribution value. For instance, if a single geographic section of a field historically has lower yields, then this fact can be used to calculate a performance index when in this area (e.g., by artificially raising the index to compensate).

User feedback logic 236 retrieves feedback from operator 196. User feedback logic 236 can automatically receive feedback from operator 196, as indicated by block 238. For instance, user feedback logic 236 can receive monitoring data from operator monitoring logic 216 which contains sensor data indicative of feedback from the operator. In one example, this data can contain eye tracking information for the operator, which can indicate that the operator is paying extra attention to a specific subsystem (e.g., engine temperature gauge) or performance category (e.g., tons of grain per hour). User feedback logic 236 can manually receive user feedback, as indicated by block 240. For example, user feedback logic 236 can generate an interface for operator 196 to interact with and provide feedback manually. User feedback logic 236 can receive feedback in other ways as well, as indicated by block 242.

Consumption index generator logic 234 generates a consumption index, that is a value that quantifies how many resources the component uses, for the variety of components on mobile machine 100. The consumption index can be comparative to the other systems, an absolute value (e.g., horsepower, watts) or as a part of the maximum resources that the machine can provide (e.g., 30% of maximum power usage).

Cloud interaction logic 248 interacts with cloud or other remote systems. For instance, cloud interaction logic 248 can retrieve weather data from an online weather source.

Improvement logic 254 operates to improve (e.g, optimize) the overall machine performance. Improvement logic 254 includes neural network/deep learning processor(s)/server(s) 256, preference setting logic 258, resource allocation logic 260, algorithm selection logic 262, learned information store 264, control system interface logic 272, initial training logic 274 and can include other items as well, as indicated by block 276. Neural network/deep learning processors/servers 256 provide the processing power for other logic components of improvement logic 254.

Preference setting logic 258 allows a user to select any preferences on the operation of mobile machine 100 that they might have. For instance, a user may value grain quality over grain savings. Performance setting logic 258 can operate with manual operator control as indicated by block 259, or can automatically detect an operator's preferences, as indicated by block 261. Manual control of performance setting logic 258 can include generating an interface that allows an operator to choose which settings they prioritize, such as described above. In another example, manual control performance setting logic 258 includes a post operation survey that requires an operator about the machine performance during operation. Of course, preferences may be set in other ways as well, as indicated by block 263.

Resource allocation logic 260 utilizes learned information store 264 to allocate resources to meet a user's preferences (e.g., set with preference setting logic 258) and/or improve the overall system performance. For instance, conflicts between subsystems that compete for resources (e.g., engine power) can be identified and the resources redistributed to the subsystems accordingly.

Algorithm selection logic 262 selects the machine learning algorithm used to train models which will later be used to generate machine controls for optimization (or improvement). In some examples, algorithm selection logic 262 selects more than one algorithm or machine learning method (e.g., different algorithms can be used to generate different parts of an overall machine control model). For instance, a feed rate control subsystem may use a predictive control algorithm while the crop harvesting subsystem uses a deep reinforcement learning algorithm.

Some examples of machine learning algorithms include, but are not limited to, attention mechanisms, memory networks, Bayes systems, decision trees, Eigenvectors, Eigenvalues and Machine Learning, Evolutionary & Genetic Algorithms, Expert Systems/Rules Engines/Symbolic Reasoning, Generative Adversarial Networks (GANs), Graph Analytics and ML, Linear Regression, Logistic Regression, LSTMs and Recurrent Neural Networks, Markov Chain Monte Carlo Methods (MCMC), Neural Networks, Random Forests, Reinforcement Learning, etc.

Learned information store 264 stores the machine learning data and models generated by a machine learning process. As shown, learned information store 264 is on the mobile machine, but in other examples, learned information store 265 can be at a remote location.

Control system interface logic 272 interacts with control system 186 to generate the control signals according to the plan generated by resource allocation logic 260.

Initial training logic 274 receives historical circumstantial data and to train the machine learning system. For example, initial training logic 274 can generate/train a new neural network based on data (e.g., machine, operator sensor data) and results (e.g., performance indexes) that can be utilized for runtime machine control. In some examples, the neural network will be trained further during runtime to update to changing conditions or to reinforce consistent results.

Figure 4:
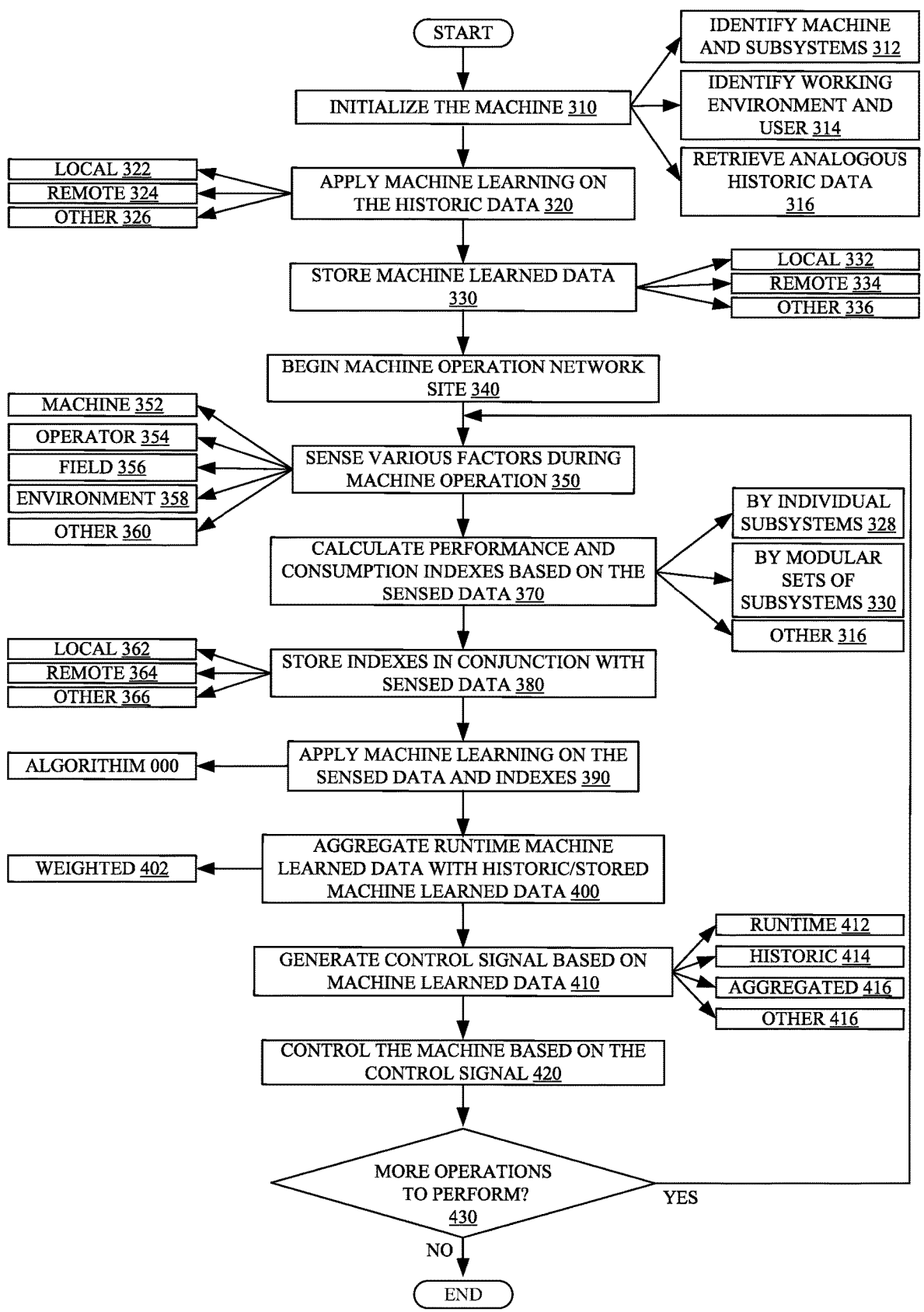
FIG. 4 is a flow diagram showing one example of the operation of the supervisory or optimization (or improvement) system.

FIG. 4 is a flow diagram showing an example operation of mobile machine 100. Operation 300 begins at block 310 where machine is initialized. Initializing this machine can include identifying the machine and its subsystems, as indicated by block 312. Then identifying the working environment and the operator, as indicated by block 314. Then analogous stored data is retrieved and loaded into the machine or another system for storage. Analogous historic data includes data collected from a same or similar machine, a same or similar operator, a same or similar subsystems, etc. during operation.

Operation 300 proceeds at block 320 where machine learning is applied on the retrieved analogous historic data to generate a model which indicates which machine settings should be used under differing circumstances (e.g., different operators, managers, machines, crops, weather, field conditions, etc.) to improve (e.g., optimize) the system. The machine learning can be processed locally (e.g., on the machine or a computer system proximate the machine), as indicated by block 322. The machine learning can be processed remotely (e.g., such as at a remote data processing center), as indicated by block 324. The machine learning can be processed at other places as well, as indicated by block 326.

Operation 300 proceeds at block 330 where the machine learned data and/or model is stored. The machine learned data can be stored locally, as indicated by block 332. For instance, on the mobile machine or a computer on proximate mobile machine. The machine learned data can be stored remotely, as indicated by block 334. For instance, at a remote server. The machine data can be stored elsewhere as well, as indicated by block 336. For example, the data can be stored partially on the machine and partially remotely.

Operation 300 proceeds at block 340 where the machine begins operation at the worksite. For example, the machine begins harvesting crop at a field.

Operation 300 proceeds at block 350 where various characteristics are sensed or data is received during machine operation. As indicated by block 352 machine characteristics can be sensed. For instance, the engine RPM, engine temperature, engine power/torque consumption traveling speed, machine settings, etc. can be sensed. As indicated by block 354, operator characteristics can be sensed during machine operation. For instance, the operators heart rate, breathing, movements, gestures, eye movement, etc. can be sensed. As indicated by block 356, field characteristics can be sensed during machine operation. For example, field moisture, crops vegetation, standing water, etc. can be sensed. Environmental characteristics can be sensed during machine operation, as indicated by blood 358. For example, ambient temperature, precipitation, barometric pressure, wind, etc. can be sensed. Other characteristics can be sensed during machine operation as well, as indicated by block 360.

Operation 300 proceeds at block 370 where performance and consumption indexes are calculated based on the sensed data from block 350. Performance indexes are indicative of the machine's performance and consumption indexes are indicative of the resources that the unit is consuming. The indexes can be calculated by individual subsystem, as indicated by block 372. For instance, individual indexes can be generated for power/steering subsystem, cleaning subsystem, threshing subsystem, chafing subsystem, spreading subsystem, etc. The indexes can be calculated by modular sets of subsystems or components. For example, the steering and propulsion subsystems may be grouped together or the sieving and chaffing subsystems may be grouped together or the header and feeder housing subsystems can be grouped together, etc. The indexes can be grouped together in other ways as well, as indicated by block 376.

Operation 300 proceeds at block 360 where the indexes are stored in conjunction with the sensed data from block 350. As indicated by block 362, the indexes and data can be stored locally, on the machine, for example. As indicated by block 364, the indexes and data can be stored remotely, at a remote server, for example. As indicated by block 366, the indexes in conjunction with the data stored elsewhere.

At block 390, machine learning is applied on the sensed data and indexes to update the control model. For example, the sensed data is fed into the machine learning system as inputs and the indexes they produce is fed into the machine learning as results. In this case, the machine learning process discovers patterns or models which can be useful to predict results based on a given set of inputs. Once a number of patterns or models are found to represent the correlation, machine learning has occurred. These models are especially useful in predicting results (e.g., performance and consumption indexes) based on inputs (e.g., machine sensors).

In some examples, the indexes are modified based on models or other types of machine learned data. For example, assuming all other factors and objective results are the same, the first operator may feel that the results are very good, while a second operator may feel that the results are below their expectations. In this case, the performance index generator may learn to cater the performance index to the operator, which would mean lowering the performance index generated for the second operator and keeping the performance index the same for the first operators even though all other factors are the same. In other examples, if the user is unsatisfied with the results, the system will explore new and/or different machine settings to improve machine performance to the operator's satisfaction.

Operation 300 proceeds at block 400 where the runtime machine learned data is aggregated with the historic and previously stored machine learned data. In one example, aggregation includes reinforcement learning of the stored data with the runtime machine learned data. As indicated by block 402, during aggregation, the runtime machine learned data that is reinforcing the historic/stored machine data can have its reinforcing effect weighted either higher or lower For instance, if there is a reason to believe current runtime data could be inaccurate or misleading (e.g., possibly a malfunctioning sensor or an anomaly in the field) then this should be treated as an outlier and not have an overly large effect on a large amount past data.

Operation 300 proceeds at block 410 where control signals are generated based on the machine learned data. As indicated by block 412, the control signals can be generated based on the runtime machine learned data. As indicated by block 414, the control signals can be generated based on the historic or stored machine learned data. As indicated by block 416, the control signals can be generated based on the aggregated machine learned data. As indicated by Block 418, the control signals can be generated based on other data as well.

Operation 300 proceeds at block 420 where the machine is controlled based on the generated control signal.

Operation 300 proceeds at block 430 where it is determined if there are more operations to perform. If there are no more operations to perform, operation 300 ends. If there are additional operations to perform, operation proceeds again at block 350.

Figure 5:
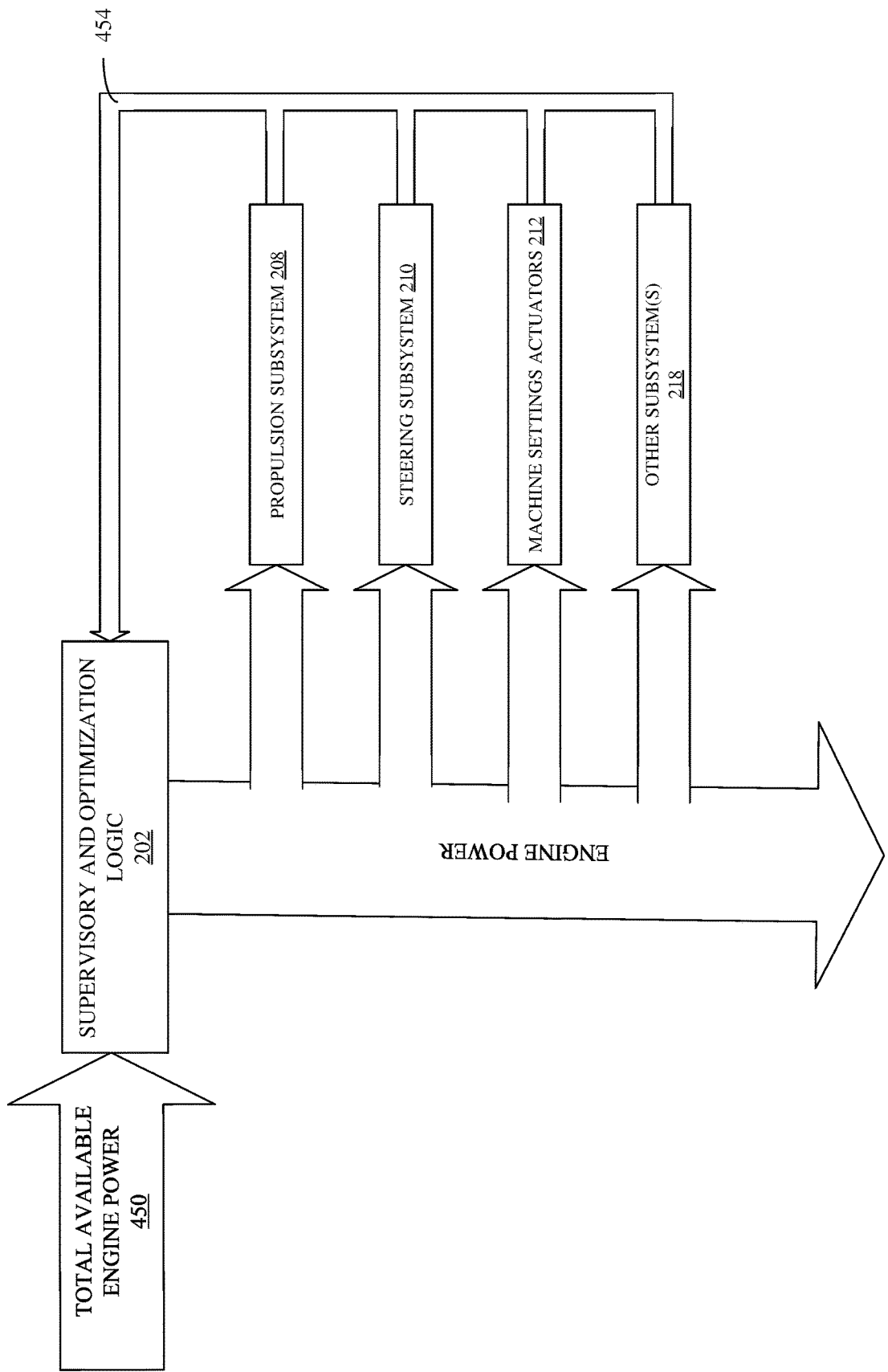
FIG. 5 is a block diagram showing an example power allocation workflow

FIG. 5 is a block diagram showing an example power allocation workflow. As shown the total engine power 450 is received by supervisory and optimization system 202 and allocated to the various subsystems 208-218. Supervisory and optimization system 202 also receives power requests 454 from the various components 208-218 as well. In one example these requests are granted based on priority of the subsystem that is requesting power. For instance, supervisory and optimization system 202 determines priority of the subsystem based on what subsystems need the power for the overall system to perform better. Supervisory and optimization system 202 is able to determine a subsystem's needs to improve overall machine performance based on, for example, one of the machine learning processes discussed above.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
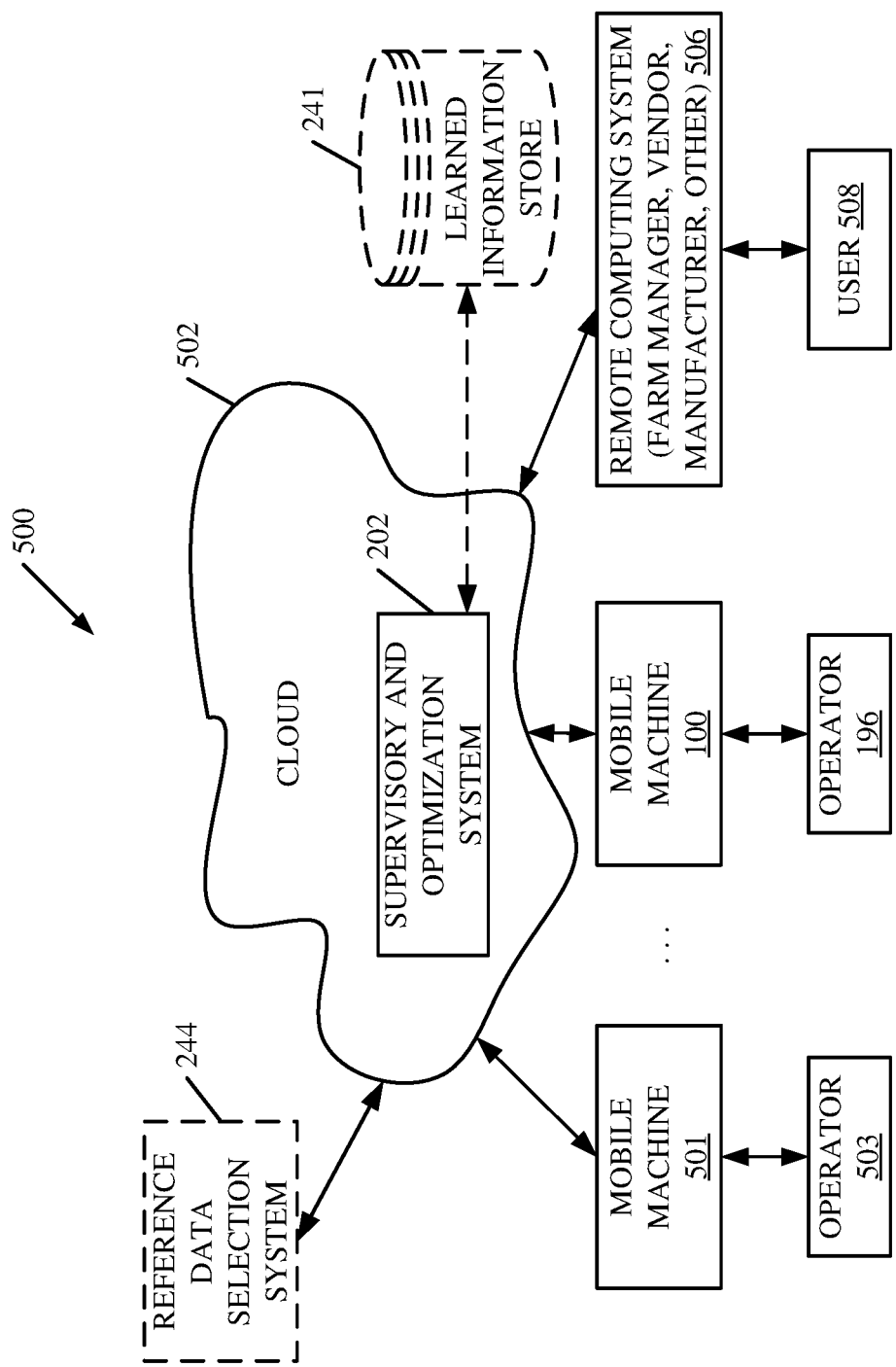
FIG. 6 is a block diagram showing one example of the mobile machine, disposed in a remote server architecture.

FIG. 6 is a block diagram of machine 100, shown in FIG. 1, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIGS. 2 and 3 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 6, some items are similar to those shown in FIGS. 2 and 3 and they are similarly numbered. FIG. 6 specifically shows that optimization and supervisory system 202 can be located at a remote server location 502. Therefore, harvester 100 accesses those systems through remote server location 502.

FIG. 6 also depicts another example of a remote server architecture. FIG. 5 shows that it is also contemplated that some elements of FIGS. 2 and 3 are disposed at remote server location 502 while others are not. In FIG. 6 for example, system 202 is located in cloud 502 and it can be used by multiple machines (such as machine 100 and machine 501, which may be similar to machine 100, or different, and which has its own operator 503). Thus, system 202 can generate aggregated fleet values that are similar to the aggregate change value discussed above with respect to FIG. 6, but which are aggregated across multiple different machines.

Similarly, FIG. 6 shows that some items may be located in still different locations. By way of example, data store 241 or reference data selection system 244 can be disposed at a location separate from location 502, and accessed through the remote server at location 502. Regardless of where they are located, they can be accessed directly by harvester 100, and machine 501, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an examples, where cell coverage is poor or non-existent, another mobile machine (such as a fuel truck) can have an automated information collection system. As the harvester comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the harvester until the harvester enters a covered location. The harvester, itself, can then send the information to the main network.

Further, FIG. 6 shows that architecture 500 can include a remote computing system 506 that is used by another user 508. System 202 can thus send the various values and control outputs to remote computing system 506 where they are surfaced for user 508. System 506 may thus be a computing system that is remote from machines 100, 501. It may be a farm or fleet manger's system, a vendor's system, a manufacturer's system, etc.

It will also be noted that the elements of FIG. 2, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
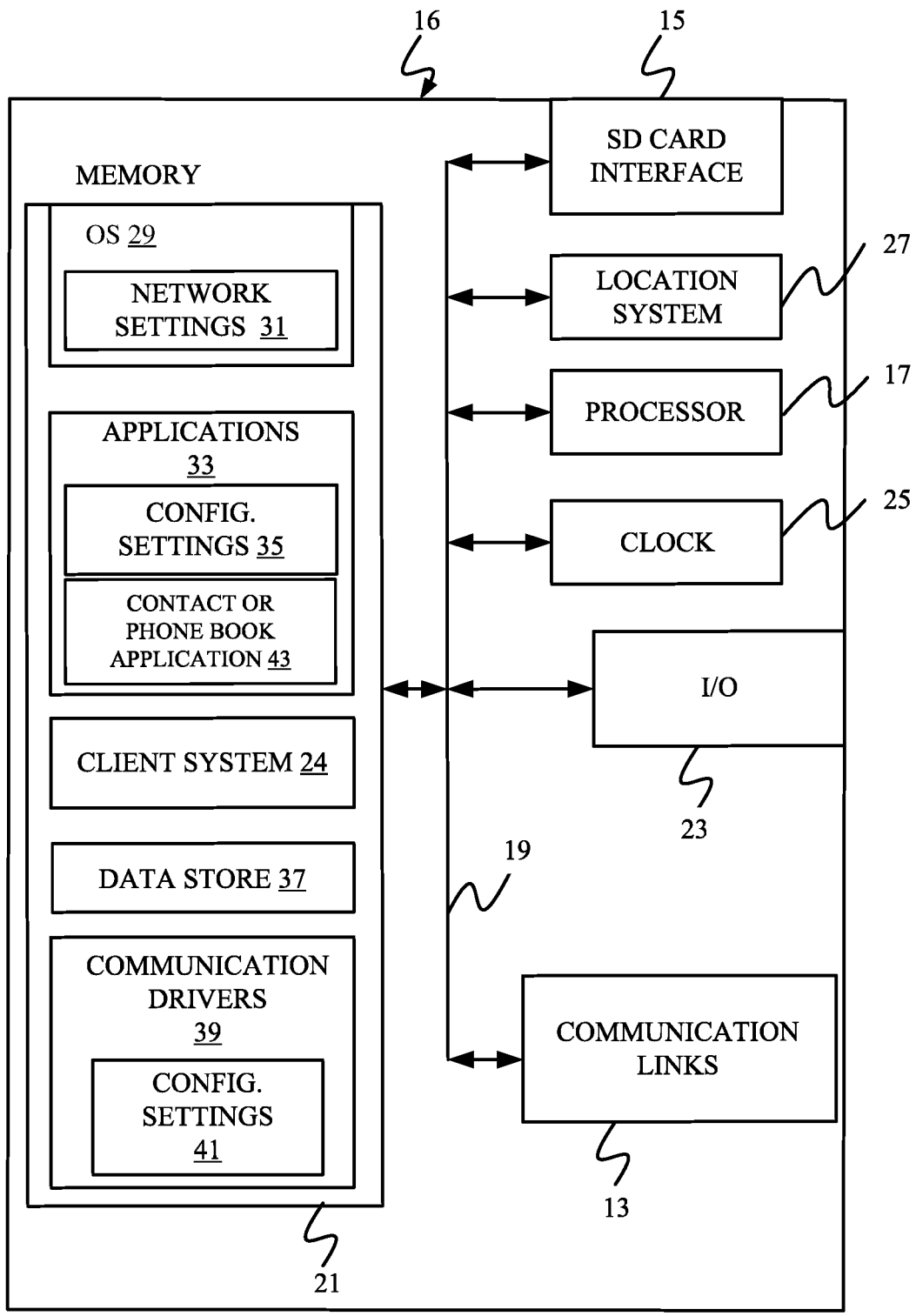
FIGS. 7-9 show examples of mobile devices that can be used in the architectures shown in the previous FIGS.
Figure 8:
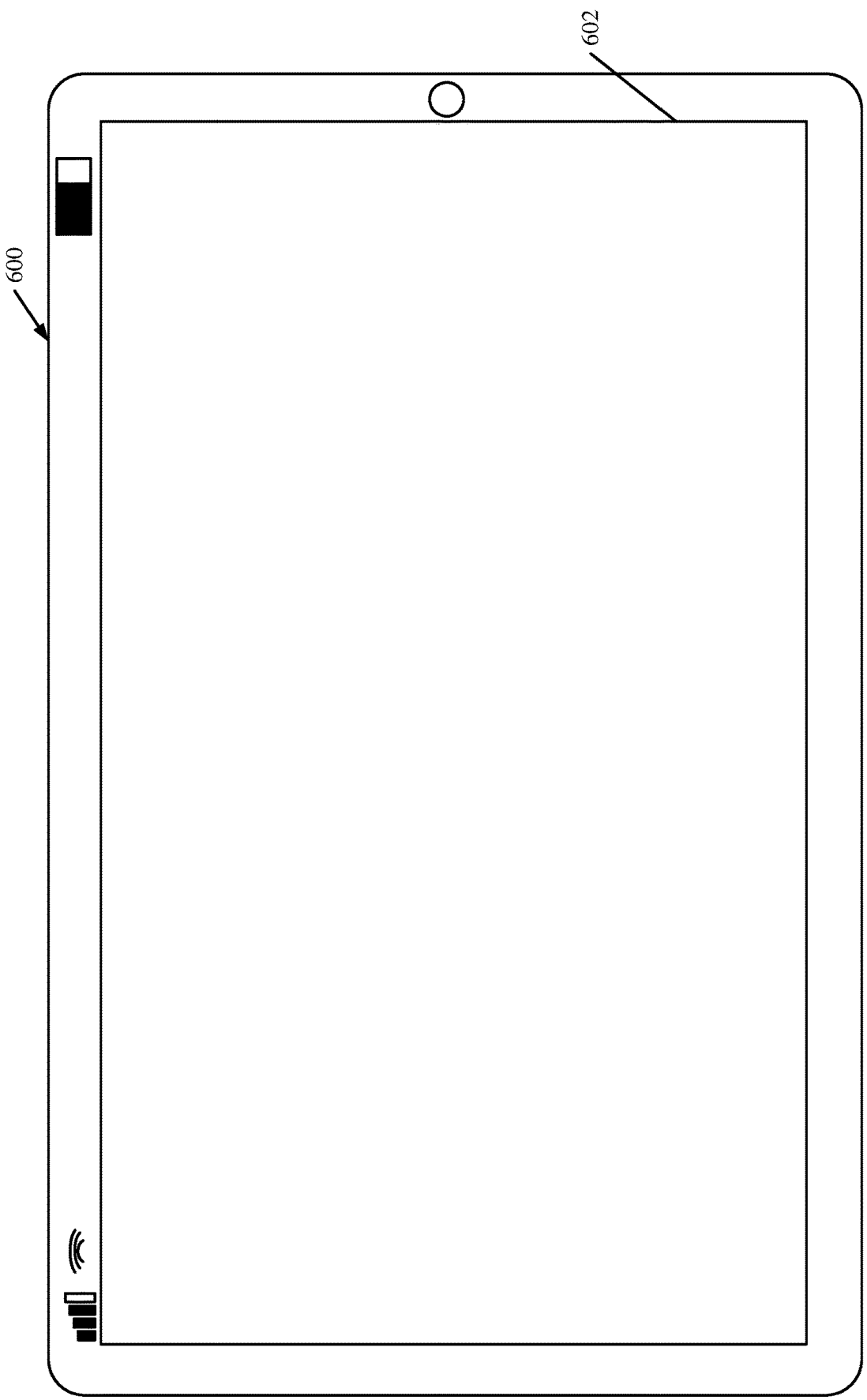
Figure 9:
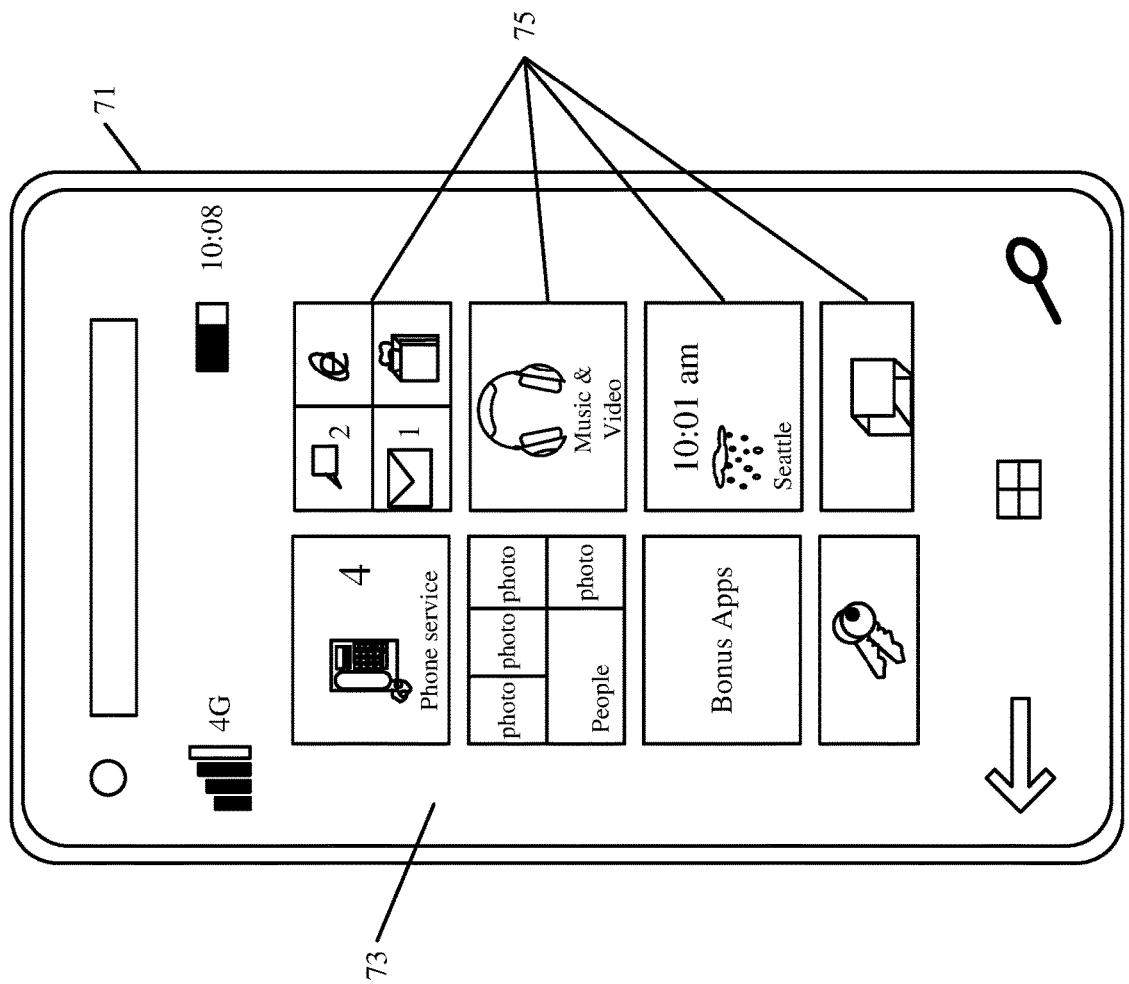

FIG. 7 is a simplified block diagram of one illustrative example of a handheld or mobile computing device that can be used as a user's or client's hand held device 16, in which the present system (or parts of it) can be deployed. For instance, a mobile device can be deployed in the operator compartment of harvester 100 for use in generating, processing, or displaying the control operations. FIGS. 8-9 are examples of handheld or mobile devices.

FIG. 7 provides a general block diagram of the components of a client device 16 that can run some components shown in FIGS. 2 and/or 3, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various example of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 8 shows one example in which device 16 is a tablet computer 600. In FIG. 8, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 9 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
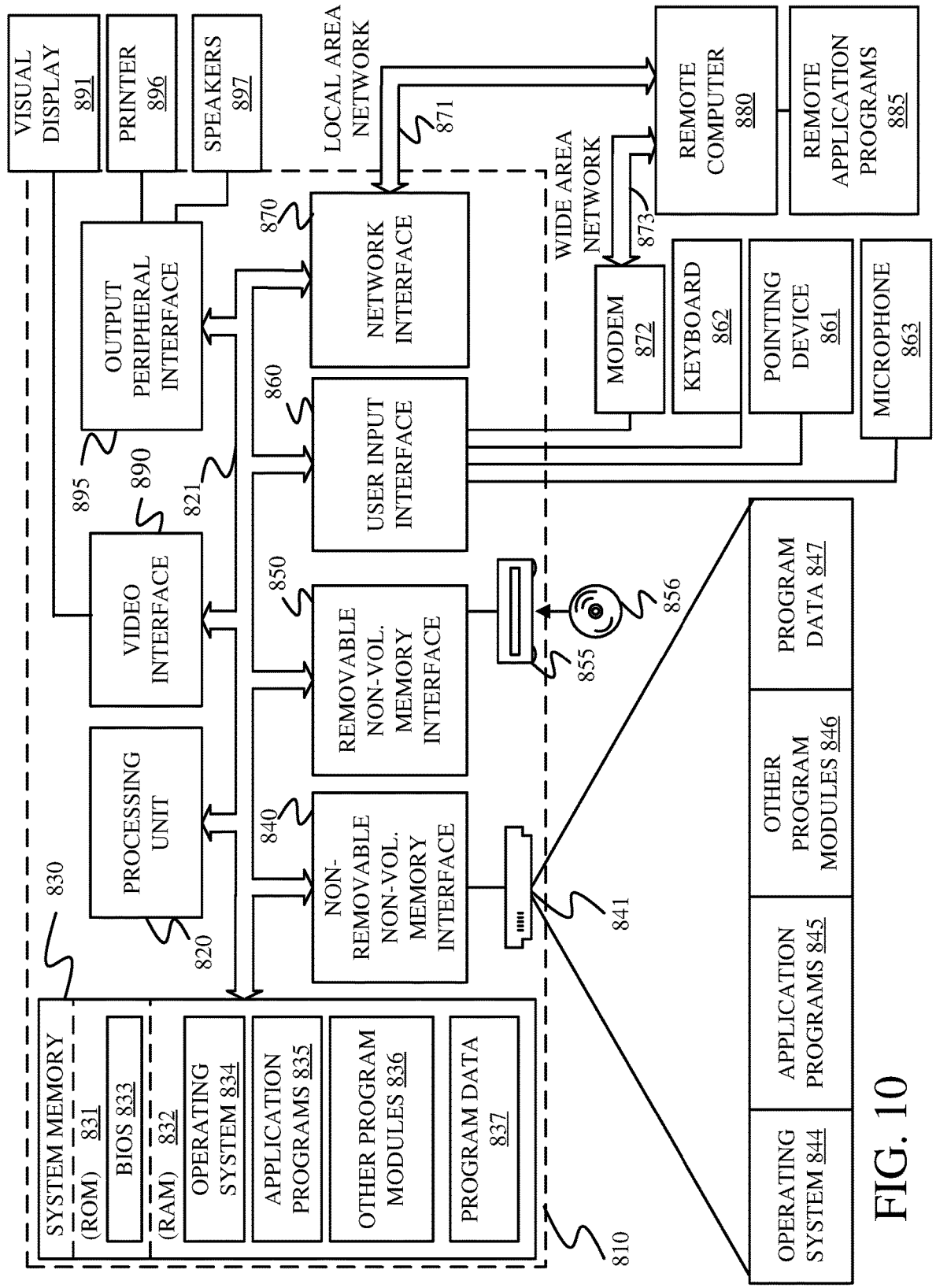
FIG. 10 is a block diagram showing one example of a computing environment that can be used in the architectures shown in the previous FIGS.

FIG. 10 is one example of a computing environment in which elements of FIGS. 2 and/or 3, or parts of it, (for example) can be deployed. With reference to FIG. 10, an example system for implementing some embodiments includes a general-purpose computing device in the form of a computer 810. Components of computer 810 may include, but are not limited to, a processing unit 820 (which can comprise processors or servers from pervious FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIGS. 2 and/or 3 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN, controller area network—CAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 10 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a mobile machine, comprising:

a propulsion subsystem that propels the mobile machine across an operational environment;

machine monitoring logic that receives a sensor signal indicative of a value of a sensed machine variable;

operator monitoring logic that receives an operator sensor signal indicative of a value of a sensed operator variable;

performance index generator logic that receives the sensed machine variable and the sensed operator value and generates a performance index based on the sensed machine variable and the sensed operator value;

an improvement system that accesses historic circumstantial data and receives the performance index and generates an improvement signal based on the performance index, and the historic circumstantial data; and control signal generator logic that generates a control signal based on the improvement signal to perform a machine operation.

Example 2 is the mobile machine of any or all previous examples and further comprising an operator sensor that generates the operator sensor signal.

Example 3 is the mobile machine of any or all previous examples wherein the operator sensor comprises an eye tracking sensor and wherein the performance index generator logic generates the performance index based, at least in part, on where the operator is looking.

Example 4 is the mobile machine of any or all previous examples wherein the operator sensor comprises an operator movement sensor and wherein the performance index generator logic generates the performance index based, at least in part, on how the operator is moving.

Example 5 is the mobile machine of any or all previous examples wherein the operator sensor comprises an operator facial expression sensor and wherein the performance index generator logic generates the performance index based, at least in part, on a facial expression of the operator.

Example 6 is the mobile machine of any or all previous examples wherein the operator sensor comprises an operator heart sensor or an operator respiration sensor and wherein the performance index generator logic generates the performance index based, at least in part, on a heart characteristic of the operator or a respiration characteristic of the operator.

Example 7 is the mobile machine of any or all previous examples wherein the optimization system generates the optimization system to re allocate machine resources from an over-powered machine subsystem to an under-powered subsystem.

Example 8 is the mobile machine of any or all previous examples wherein the optimization system comprises:

a deep learning processor that performs a machine learning process on the historic circumstantial data to generate the optimization signal.

Example 9 is the mobile machine of any or all previous examples wherein the machine learning process comprises generating a neural network.

Example 10 is a computer implemented method, comprising:

receiving a machine sensor signal indicating a value of a sensed machine variable that is sensed on a mobile machine;

calculating a current performance index based on the sensed machine variable;

retrieving historic circumstantial data and historic performance indexes that correspond to subsets of the historic circumstantial data;

identifying a machine performance gap between the current performance index and one of the historic performance indexes;

identifying, using a neural network or machine learning processor, a machine change operation based on the historic circumstantial data and the sensed machine variable; and controlling the machine to implement the machine change operation.

Example 11 is the computer implemented method of any or all previous examples and further comprising receiving an environmental sensor signal indicating a value of a sensed environmental variable that is sensed proximate the mobile machine and wherein calculating the current performance index is based, at least in part, on the sensed environmental variable.

Example 12 is the computer implemented method of any or all previous examples and further comprising:

receiving a second machine sensor signal indicative of a machine subsystem resource consumption; and calculating a current consumption index based on the second machine sensor signal.

Example 13 is the computer implemented method of any or all previous examples wherein identifying, using a neural network or machine learning processor, the machine change operation is also based on the current consumption index.

Example 14 is the computer implemented method of any or all previous examples and further comprising:

sensing an operator characteristic and generating an operator sensor signal indicative of a value of the operator characteristic that is sensed proximate an operator;

receiving the operator sensor signal and wherein calculating the current performance index is based, at least in part, on the sensed operator variable Example 15 is the computer implemented method of any or all previous examples wherein sensing the operator characteristic comprises:

sensing an operator heart rate.

Example 16 is the computer implemented method of any or all previous examples wherein sensing the operator characteristic comprises:

sensing an operator eye position.

Example 17 is the computer implemented method of any or all previous examples wherein sensing the operator characteristic comprises:
sensing an operator body movement.

Example 18 is the computer implemented method of any or all previous examples and further comprising:
surfacing the indication of the machine change operation on a display of the mobile machine.

Example 19 is a mobile machine, comprising:
a set of controllable subsystems;
a plurality of machine sensors that sense a plurality of machine variables and generate a plurality of machine sensor signals indicative of a value of the plurality of machine variables;
an operator sensor configured to sense an operator variable and generate an operator sensor signal indicative of a value of the operator variable;
optimization logic that receives the plurality of machine sensor signals and operator sensor signal and generates a machine learning model based on the plurality of machine sensor signals and operator sensor signal; and
control signal generator logic that that identifies a machine control operation based on the machine learning model and generates a control signal to control at least one of the set of controllable subsystems to perform the machine control operation.

Example 20 is the mobile machine of any or all previous examples wherein the optimization logic comprises:
initial training logic that receives a plurality of historic machine sensor signals and a plurality of historic operator sensor signal and uses a machine learning method to generate a first machine learning model based on the plurality of historic machine sensor signals and the plurality of historic operator sensor signal; and
wherein the optimization logic generates the machine learning model based, at least in part, on the first machine learning model.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile machine, comprising:
a propulsion subsystem that propels the mobile machine across an operational environment;
machine monitoring logic that receives a sensor signal indicative of a value of a sensed machine variable;
operator monitoring logic that receives an operator sensor signal indicative of a value of a sensed operator variable;
performance index generator logic that receives the sensed machine variable and the sensed operator value and generates a performance index, indicative of how well the mobile machine is performing, based on the sensed machine variable and the sensed operator value;
an improvement system that accesses historic circumstantial data and receives the performance index and generates an improvement signal based on the performance index, and the historic circumstantial data; and
control signal generator logic that generates a control signal based on the improvement signal to perform a machine operation.

2. The mobile machine of claim 1, and further comprising an operator sensor that generates the operator sensor signal.

3. The mobile machine of claim 2, wherein the operator sensor comprises an eye tracking sensor and wherein the performance index generator logic generates the performance index based, at least in part, on where the operator is looking.

4. The mobile machine of claim 2, wherein the operator sensor comprises an operator movement sensor and wherein the performance index generator logic generates the performance index based, at least in part, on how the operator is moving.

5. The mobile machine of claim 2, wherein the operator sensor comprises an operator facial expression sensor and wherein the performance index generator logic generates the performance index based, at least in part, on a facial expression of the operator.

6. The mobile machine of claim 2, wherein the operator sensor comprises an operator heart sensor or an operator respiration sensor and wherein the performance index generator logic generates the performance index based, at least in part, on a heart characteristic of the operator or a respiration characteristic of the operator.

7. The mobile machine of claim 1 wherein the optimization system generates the optimization system to reallocate machine resources from an over-powered machine subsystem to an under-powered subsystem.

8. The mobile machine of claim 1 wherein the optimization system comprises:
a deep learning processor that performs a machine learning process on the historic circumstantial data to generate the optimization signal.

9. The mobile machine of claim 8 wherein the machine learning process comprises generating a neural network.

10. A computer implemented method, comprising:
receiving a machine sensor signal indicating a value of a sensed machine variable that is sensed on a mobile machine;
calculating a current performance index based on the sensed machine variable;
retrieving historic circumstantial data and historic performance indexes that correspond to subsets of the historic circumstantial data;
identifying a machine performance gap between the current performance index and one of the historic performance indexes;
identifying, using a neural network or machine learning processor, a machine change operation based on the historic circumstantial data and the sensed machine variable; and
controlling the machine to implement the machine change operation.

11. The computer implemented method of claim 10, and further comprising: receiving an environmental sensor signal indicating a value of a sensed environmental variable that is sensed proximate the mobile machine and wherein calculating the current performance index is based, at least in part, on the sensed environmental variable.

12. The computer implemented method of claim 10, and further comprising:
receiving a second machine sensor signal indicative of a machine subsystem resource consumption; and
calculating a current consumption index based on the second machine sensor signal.

13. The computer implemented method of claim 12 wherein identifying, using a neural network or machine learning processor, the machine change operation is also based on the current consumption index.

14. The computer implemented method of claim 10 and further comprising:
sensing an operator characteristic and generating an operator sensor signal indicative of a value of the operator characteristic that is sensed proximate an operator; and
receiving the operator sensor signal and wherein calculating the current performance index is based, at least in part, on the sensed operator variable.

15. The computer implemented method of claim 14 wherein sensing the operator characteristic comprises:
sensing an operator heart rate.

16. The computer implemented method of claim 14 wherein sensing the operator characteristic comprises:
sensing an operator eye position.

17. The computer implemented method of claim 14 wherein sensing the operator characteristic comprises:
sensing an operator body movement.

18. The computer implemented method of claim 10 and further comprising:
surfacing the indication of the machine change operation on a display of the mobile machine.

19. A mobile machine, comprising:
a set of controllable subsystems;
a plurality of machine sensors that sense a plurality of machine variables and generate a plurality of machine sensor signals indicative of a value of the plurality of machine variables;
an operator sensor configured to sense an operator variable and generate an operator sensor signal indicative of a value of the operator variable;
performance index generator logic that receives the plurality of machine sensor signals and the operator sensor signal and generates a performance index, indicative of a performance of the machine, based on the plurality of machine sensor signals and the operator sensor signal;
optimization logic that receives the plurality of machine sensor signals, the operator sensor signal, and the performance index and generates a machine learning model based on the plurality of machine sensor signals, the operator sensor signal, and the performance index; and
control signal generator logic that that identifies a machine control operation based on the machine learning model and generates a control signal to control at least one of the set of controllable subsystems to perform the machine control operation.

20. The mobile machine of claim 19 wherein the optimization logic comprises:
initial training logic that receives a plurality of historic machine sensor signals, a plurality of historic operator sensor signals, and a plurality of historic performance indexes and uses a machine learning method to generate a first machine learning model based on the plurality of historic machine sensor signals, the plurality of historic operator sensor signal, and the plurality of historic performance indexes; and
wherein the optimization logic generates the machine learning model based, at least in part, on the first machine learning model.

* * * * *